United States Patent [19]

Shiell et al.

[11] Patent Number: 5,963,721

[45] Date of Patent: Oct. 5, 1999

[54] MICROPROCESSOR SYSTEM WITH CAPABILITY FOR ASYNCHRONOUS BUS TRANSACTIONS

[75] Inventors: Jonathan H. Shiell, Plano; Ian Chen, Houston; Robert W. Milhaupt, Richardson, all of Tex.

[73] Assignee: Texas Instruments Incorporated, Dallas, Tex.

[21] Appl. No.: 08/777,322

[22] Filed: Dec. 27, 1996

Related U.S. Application Data

[60] Provisional application No. 60/009,318, Dec. 29, 1995.

[51] Int. Cl.$^6$ ...................................................... G06F 3/00
[52] U.S. Cl. ........................................... 395/309; 395/841
[58] Field of Search .................................... 395/308, 309, 395/311, 823, 825, 841

[56] References Cited

U.S. PATENT DOCUMENTS

| | | | |
|---|---|---|---|
| 5,228,134 | 7/1993 | MacWilliams | 711/138 |
| 5,276,852 | 1/1994 | Callander | 395/309 |
| 5,293,603 | 3/1994 | MacWilliams | 395/425 |
| 5,319,766 | 6/1994 | Thaller | 395/425 |
| 5,440,754 | 8/1995 | Goeppel | 395/800 |
| 5,450,551 | 9/1995 | Amini | 395/299 |
| 5,517,624 | 5/1996 | Landry | 395/287 |
| 5,555,381 | 9/1996 | Ludwig | 395/281 |
| 5,592,685 | 1/1997 | Pawlowski | 395/882 |
| 5,604,875 | 2/1997 | Munce | 395/311 |
| 5,745,732 | 4/1998 | Cherukuri | 395/495 |

FOREIGN PATENT DOCUMENTS 2 287 161  1/1995  United Kingdom .

Primary Examiner—Eric Coleman
Attorney, Agent, or Firm—Rebecca Mapstone Lake; Richard L. Donaldson

[57] ABSTRACT

A microprocessor-based data processing system (2) in which asynchronous bus transactions are performed is disclosed. The disclosed embodiments include one or more microprocessors (5) of the x86-architecture type, compatible with the P54C bus protocol, preferably Pentium-compatible microprocessors, as the central processing units (CPUs) of the system. A CPU ($5_r$) requests an asynchronous bus transaction, in a first disclosed embodiment, by presenting a combination of control signals that is unused in conventional x86-architecture systems; the controller chipset (27) determines whether the transaction may be performed in an asynchronous manner, and later returns an acknowledge or non-acknowledge code to the requesting CPU ($5_r$). The microprocessors (5) include certain pins, in this first embodiment, corresponding to conventional Pentium-compatible output pins but which now have receiver circuitry for receiving the acknowledge and non-acknowledge codes, along with the transaction identifier. If the transaction is accepted as asynchronous, the identifier is used to later identify the transaction when access is granted. A second disclosed embodiment provides an immediate indication of the acceptability of the requested transaction as of the asynchronous type, so that unacceptable transactions may be immediately processed in synchronous fashion. A third disclosed embodiment uses an additional terminal to indicate the acknowledge or non-acknowledge response.

23 Claims, 10 Drawing Sheets

MICROPROCESSOR SYSTEM WITH CAPABILITY FOR ASYNCHRONOUS BUS TRANSACTIONS

This application claims priority under 35 § 119(e)(1) of provisional application number 60/009,318 filed Dec. 29, 1995.

FIELD OF THE INVENTION

This invention is in the field of microprocessor-based systems, and is more specifically directed to bus transaction control in such systems.

BACKGROUND OF THE INVENTION

As is appreciated in the art, the performance of modern complex microprocessor-based systems, such as personal computer workstations and portable computers, depends in large part on the quantity of digital data per unit time communicated among the various system components. Conventional data processing systems typically include a microprocessor as a central processing unit (CPU), connected to off-chip memory and input/output (I/O) functions via a bus. Specifically, conventional PC-architectures utilize an x86-architecture microprocessor as a CPU, and which communicates with memory and performs I/O functions via a so-called "chipset" of integrated circuit logic functions that buffer and control bus traffic between these subsystems and the CPU. In conventional systems that utilize a single CPU operating in a sequential fashion, the rate of data traffic on the bus may be optimized in a relatively straightforward manner.

However, certain improvements in system architecture require more complex bus transactions between the CPU and the memory and I/O subsystems to optimize the effects of the improvements on system performance. The use of multiple CPUs in a single system is well-known in the field of data processing systems, resulting in a so-called "multiprocessor" system. The system performance is improved, of course, by the additional CPUs executing instructions in parallel.

Another example of such an improvement is the use of "out-of-order" execution by the CPU, in which the CPU executes instructions, including memory and I/O accesses, in a sequence that is different from that specified by the controlling program. Out-of-order execution typically examines the sequence of instructions ahead of the instruction currently being executed, and selects those instructions for execution that are not dependent upon the completion of preceding instructions, saving the dependent instructions for execution at a later time when the dependency is cleared, regardless of the instruction order specified in the program. Out-of-order execution thus executes instructions based upon their "readiness" to execute, rather than strictly on program order.

According to each of these approaches, however, the maximum performance improvement may be obtained only by increasing the complexity of bus transactions. One way in which bus transactions are handled with maximum efficiency in such advanced systems is through the use of "split" transaction cycles, which are also referred to in the art as "asynchronous" bus transactions. An asynchronous bus transaction refers to a transaction in which a bus request is made in one bus cycle, and in which one or more responses to the bus request are made in later bus cycles that are not contiguous in time to the request. For example, an asynchronous bus transaction request may be made in a first bus cycle, followed by bus cycles of a different type (which may be accesses to and from a different CPU from that CPU making the request in the prior cycle), which are then followed by responses to the asynchronous bus transaction request. Of course, such split bus transactions require identifying information, through the use of address or control signals, in order for the CPU or CPUs to recognize and properly respond to the bus activity in any one of the bus cycles.

By way of further background, the bus protocol for PENTIUM microprocessors (also referred to as 586-class microprocessors) available from Intel Corporation that operate at clock rates of 75 MHz or faster, and Pentium-class microprocessors compatible therewith available from other sources, is generally referred to in the art as "P54C" bus protocol. As is known in the art, P54C Pentium-class microprocessors support dual-processor operation, and as such several signals in P54C microprocessors, such as memory/IO select M/IO#, data/control select D/C#, write/read select W/R#, address status signal ADS#, and split cycle signal SCYC, are input/output signals. However, asynchronous bus transaction cycles are not supported by P54C Pentium-class microprocessors or by the current support logic (commonly referred to as "chipsets") designed for use therewith. As such, in order to provide the functionality of asynchronous bus transactions according to conventional technology, new bus architectures beyond those heretofore provided by Pentium-class microprocessors would be necessary.

By way of further background, the "P6" or PENTIUM-PRO microprocessors available from Intel Corporation, and Pentium-Pro-class microprocessors compatible therewith available from other sources, provide support for asynchronous transactions. UK Patent Application Publication GB 2 287 161 A, published on Sep. 6, 1995, describes such support by way of a dedicated signal from a requesting bus agent to request a deferred transaction, and from a target bus agent to indicate granting of the deferral of the transaction. However, these dedicated signals are not provided in, and are thus incompatible with, the P54C bus protocol indicated hereinabove. As a result, asynchronous transactions are not presently available in computer systems implemented with the P54C bus architecture. In addition, it is believed that the P6 operates to request the asynchronous transaction with an identifier that is presented on certain of its address pins in a time-multiplexed manner relative to the address value, thus requiring multiple bus cycles to request the transaction.

SUMMARY OF THE INVENTION

The present invention may be implemented in a microprocessor-based system, using one or more central processing units (CPUs) of the x86-architecture compatible with the P54C bus protocol, by providing the microprocessor with the ability to request an asynchronous transaction and to recognize later bus cycles in which the transaction is completed. The controllers in the system communicate an acknowledge or not-acknowledge condition back to the microprocessor, to indicate the acceptability of the transaction. The request sequence is presented by the CPU by way of a signal combination that is unused in Pentium-class microprocessors; the transaction identifiers are communicated in response to the CPU via signals that are conventionally outputs in x86-architecture microprocessors (e.g., the byte enable terminals).

It is therefore an object of the present invention to provide a microprocessor-based system in which asynchronous bus transactions are supported using conventional bus signal definitions.

It is a further object of the present invention to provide such a system in which multiple CPUs may cooperate with one another in performing asynchronous bus transactions to system resources such as memory and input/output devices.

It is a further object of the present invention to provide such a system in which out-of-order execution of instructions by a CPU may utilize asynchronous bus transactions.

It is a further object of the present invention to provide such a system in which a single bus cycle may be used to request the asynchronous transaction, without limitation of the address space available.

Other objects and advantages of the present invention will be apparent to those of ordinary skill in the art having reference to the following specification together with its drawings.

DETAILED DESCRIPTION OF THE PREFERRED EMBODIMENT

Figure 1:
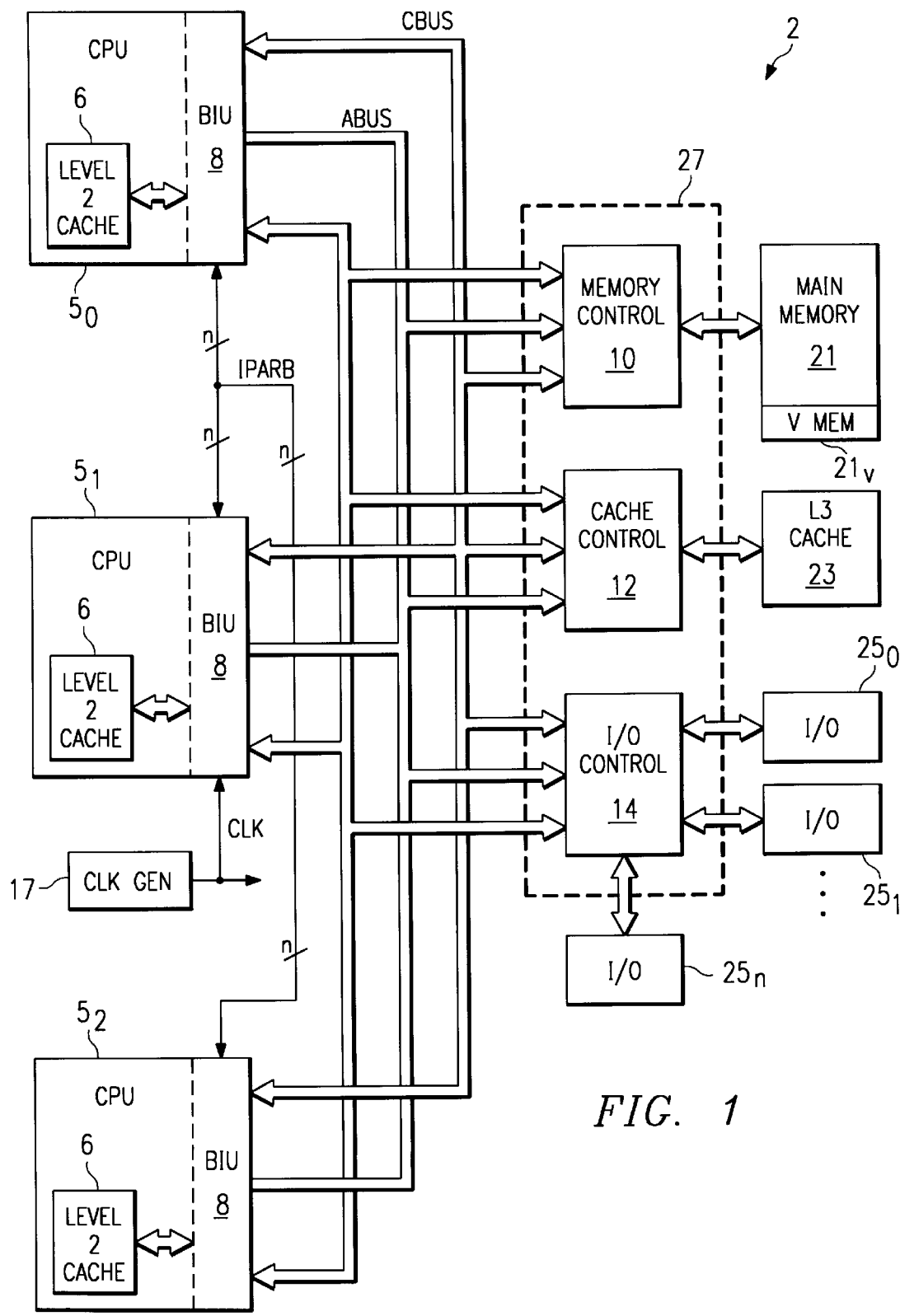
FIG. 1 is an electrical diagram, in block form, of a multiprocessor data processing system according to the preferred embodiment of the invention.

Referring first to FIG. 1, a multiprocessor data processing system 2 constructed according to the preferred embodiments of the invention will now be described by way of example. While the preferred embodiments of the invention will be described below relative to system 2 which includes multiple microprocessors, it is to be understood that the present invention will also provide important benefits in systems having a single microprocessor central processing unit (CPU). In particular, it is contemplated that the present invention will be especially beneficial in single-CPU systems utilizing out-of-order execution; as described hereinabove relative to the Background of the Invention, out-of-order execution is an operating mode in which instructions are executed based upon their readiness to execute, rather than strictly on program order. The operation of such systems based upon single CPUs will be similar to that described below, and as such it is contemplated that one of ordinary skill in the art will be readily able to construct such a system with reference to the following description.

As shown in FIG. 1, system 2 includes multiple central processing units (CPUs) $5_0$ through $5_3$, each of which, in this embodiment of the invention, is a microprocessor of the well-known "x86-architecture" and that is a P54C bus-compatible Pentium-class microprocessor compatible with and operable under the instruction set of PENTIUM microprocessors available from Intel Corporation. While three CPUs 5 are illustrated in FIG. 1 by way of example, it is contemplated, of course, that fewer or more such CPUs 5 may be incorporated into system 2.

Figure 2:
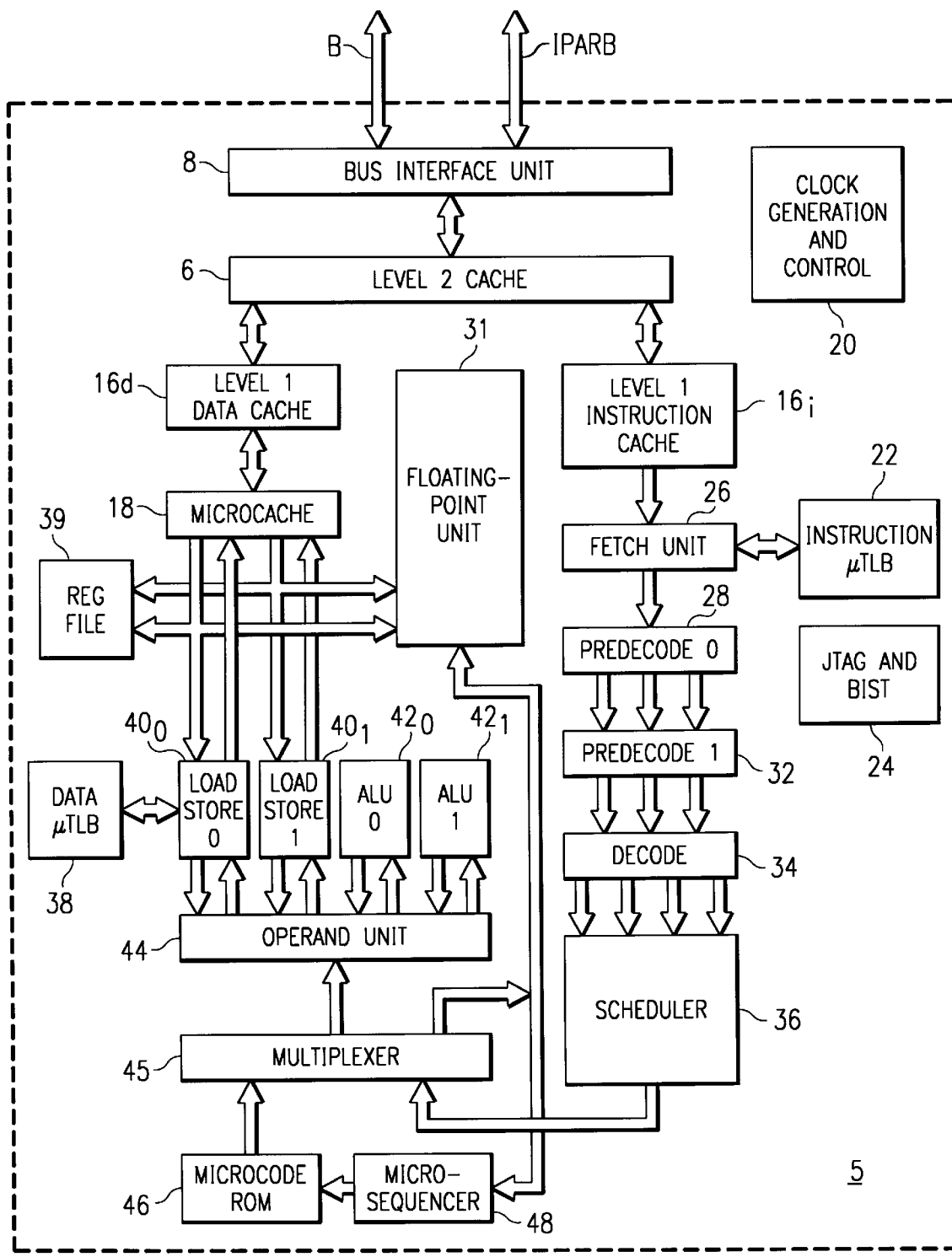
FIG. 2 is an electrical diagram, in block form, of the internal architecture of the microprocessor CPUs in the system of FIG. 1 according to the first and second preferred embodiments of the invention.

FIG. 2 illustrates, in block diagram form, the internal circuitry and functionality of one of CPUs 5 in system 2 of FIG. 1. CPU 5, as shown in FIG. 2, is connected to other system devices by way of bus B, the details of which will be described below.

CPU 5 includes bus interface unit (BIU) 8 connected to bus B, which controls and effects communication between CPU 5 and the other elements in system 2. BIU 8 includes the appropriate control and clock circuitry to perform this function, including write buffers for increasing the speed of operation, and including timing circuitry so as to synchronize the results of internal microprocessor operation with bus B timing constraints. CPU 5 also includes clock generation and control circuitry 20 which, in this example, generates internal clock phases based upon the bus clock from bus B; the frequency of the internal clock phases, in this example, may be selectably programmed as a multiple of the frequency of the bus clock.

As is evident in FIG. 2, CPU 5 has three levels of internal cache memory, with the highest of these as level 2 cache 6, which is connected to BIU 8. In this example, level 2 cache 6 is a unified cache, and is configured to receive all cacheable data and cacheable instructions from bus B via BIU 8, such that much of the bus traffic presented by CPU 5 is accomplished via level 2 cache 6. Of course, CPU 5 may also effect bus traffic around cache 6, by treating certain bus reads and writes as "not cacheable". Level 2 cache 6, as shown in FIG. 1, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 2, CPU 5 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer ($\mu$TLB) 38 is provided to translate logical data addresses into physical addresses, in the conventional manner.

These multiple execution units are controlled by way of multiple pipelines of seven stages each (plus write-back). The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |

| | |
|---|---|
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write back: This stage stores the results of the execution in registers or in memory |

Referring back to FIG. 2, the pipeline stages noted above are performed by various functional blocks within CPU 5. Fetch unit 26 generates instruction addresses from the instruction pointer by way of instruction micro-translation lookaside buffer ($\mu$TLB) 22, for application to level 1 instruction cache $16_i$. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multi-byte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from sequencer 44 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

CPU 5 also includes circuitry 24 for controlling the operation of JTAG scan testing, and of certain built-in self-test functions, ensuring the validity of the operation of CPU 5 upon completion of manufacturing, and upon resets and other events.

As noted above, each CPU 5 includes, as a portion thereof, bus interface unit (BIU) 8. BIU 8 is circuitry which serves to control and effect communication between its CPU 5 and the remainder of system 2. In this embodiment of the invention as shown in FIG. 1, BIU 8 of CPU 5 is connected to a bus consisting of address bus ABUS, data bus DBUS, and control bus CBUS. As is conventional in the art, address bus ABUS is a bus upon which CPUs 5 present binary addresses to access selected elements of system 2, data bus DBUS is a bus for the communication of digital data between CPUs 5 and the other system elements, and control bus CBUS is a bus by way of which control signals are communicated among the elements of system 2. In this example, since CPUs 5 are Pentium-class microprocessors, the bus system including buses ABUS, DBUS, CBUS is commonly referred to as a "P54C" bus. The external terminals of CPUs 5 that are connected to buses ABUS, DBUS, CBUS (generally referred to as "pins" whether implemented as integrated circuit package pins, leads, solder balls, or any other conventional packaging technology) correspond to the pins and signals named and utilized in the P54C bus protocol. In this embodiment of the invention, however, certain of these terminals have additional functionality, relative to the P54C bus protocol, that is used in implementing the preferred embodiments of the invention as will be described in detail hereinbelow.

In system 2 of FIG. 1, various peripheral elements are connected to buses ABUS, DBUS, CBUS, by way of associated controllers in chipset 27, to effect usual system functions. Main memory 21 of system 2 is coupled to buses ABUS, DBUS, CBUS by memory controller 10; as such, memory controller 10 receives address values and control signals from CPUs 5, and presents corresponding control signals to main memory 20 to effect the desired operation, which generally involves the communication of data to or from the requesting one of CPUs 5 on data bus DBUS. System 2 also includes level 3 cache memory 23, which is connected to cache controller 12 in the conventional manner; cache controller 12 is connected to buses ABUS, DBUS, CBUS, to control the communication of data between CPUs 5 and level 3 cache memory 23. In this example, level 3 cache memory 23 is a third level cache memory for system 2, with level 1 and level 2 cache memory present within each of CPUs 5 (level 2 cache 6 being shown in each of CPUs 5 in FIG. 1). System 2 also includes I/O controller 14 which is connected to CPUs 5 via buses ABUS, DBUS, CBUS, and which is also connected to several input/output devices 25. Input/output devices 25 may include typical input and output peripherals in system 2, such as a video monitor, a keyboard and pointing device, disk drive subsystems, and the like. Controllers 10, 12, 14 are typically implemented by way of a so-called "chipset" that is designed to operate in conjunction with CPUs 5, and are referred to collectively as chipset 27. System 2 further includes clock generator circuit 17, which generates a periodic clock signal on line CLK for presentation to each of the elements of system 2, including clock generation circuitry 21 within each of CPUs 5 via its BIU 8, from which internal clock signals are generated within each of the various system elements. Accordingly, it is contemplated that system 2 corresponds to a typical modem computer, such as of the desktop workstation or portable notebook type, which is implemented as a multiprocessor system, and in which computer programs are stored within disk storage (represented by one of input/output devices 25), and downloaded to main memory 21 for operation.

Memory accesses are accomplished by the presentation of an address value on bus ABUS by one of CPUs 5 in combination with the appropriate control signals on control bus CBUS (including a read/write selection signal); memory controller 10 will, in turn, present the appropriate control signals to main memory 21 to access the desired location. In this example, a portion 21v of main memory 21 is video memory, which may be independently accessed by the one of I/O functions 25 that is the graphics adaptor (or controller), either by way of buses ABUS, DBUS, CBUS or by way of a second bus (not shown); alternatively, video memory 21v could be implemented as its own device on the bus, or in a separate function such as a PCI video card. Under the control of memory controller 10, which is generally accomplished by way of a handshaking protocol between it and CPUs 5 via control bus CBUS, the requesting one of CPUs 5 either presents data on data bus DBUS (in a memory write) or receives data from data bus DBUS (in a memory read).

As illustrated in FIG. 1, both memory and input/output traffic occurs by way of the same buses, namely address bus ABUS, data bus DBUS, and control bus CBUS. Accordingly, in this embodiment of the invention as is typical for x86-architecture microprocessor-based systems, input/output accesses are performed in a similar fashion as memory accesses described above, with the requesting one of CPUs 5 presenting an address on address bus ABUS in combination with the appropriate control signals on line CBUS. For an I/O operation, the address on address bus ABUS corresponds to a particular one of input/output functions 25. Under the control of I/O controller 14, data is then communicated from the requesting one of CPUs 5 to the selected I/O function 25 via data bus DBUS (for an output operation) or from the selected I/O function 25 to the requesting one of CPUs 5 via data bus DBUS (for an input operation).

According to this embodiment of the invention, system 2 is operable to perform asynchronous bus transactions between each of CPUs 5 and the memory and I/O subsystems (i.e., main memory 21, cache 23, and I/O functions 25). As is known in the art, an asynchronous bus transaction refers to a multiple bus-cycle bus operation, in which the bus cycles corresponding to the transaction are not contiguous with one another; in effect, asynchronous bus transactions are performed in a time-multiplexed fashion. Typically, an asynchronous bus transaction has its bus request cycle (i.e., in which one of CPUs 5 of FIG. 1 presents a bus request operation) separate from the bus cycles in which data is transferred (i.e., the cycles in which valid data is presented on the bus DBUS), separated in time by data transfer bus cycles for an earlier-granted bus transaction. As such, asynchronous bus transactions require identification information to be presented in combination with the request and data transfer cycles and, in a multiprocessor system such as system 2 of FIG. 1, also require inter-processor arbitration for use of the bus among the multiple CPUs 5. As shown in FIGS. 1 and 2, inter-processor arbitration bus IPARB interconnects the BIUs 8 of CPUs 5 for the communication of inter-processor arbitration-related signals, as will be described below.

Figure 3:
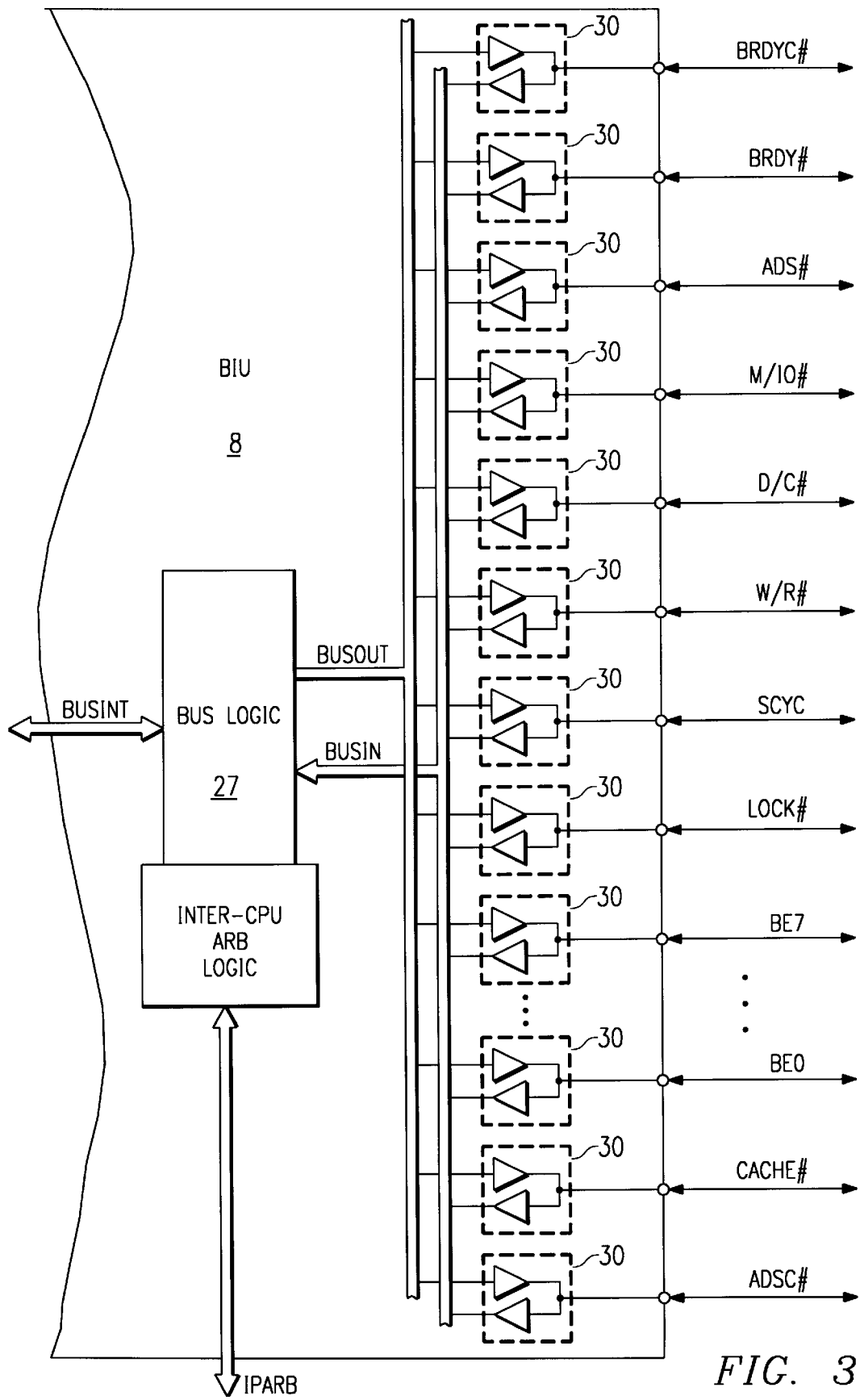
FIG. 3 is an electrical diagram, in schematic form, illustrating a portion of the bus interface unit of one of the microprocessors in the system of FIG. 1, as connected to the control bus.

Referring now to FIG. 3, a portion of BIU 8 in one of CPUs 5 of system 2 will now be described, relative to the generation and receipt of certain control signals; each of CPUs 5 will have its BIU 8 similarly arranged as that shown in FIG. 3. As is known in the art, conventional Pentium-class CPUs have control terminals, or pins, that present the output signals which indicate those byte groups of the 64-bit data bus DBUS are to be transferred in the current bus cycle. In this embodiment of the invention, each of the memory/IO select M/IO#, address status signal ADS#, data/control select D/C#, write/read select W/R#, locked bus cycle indication signal LOCK#, split cycle select SCYC, and byte enable signals BE7#-BE0# pins are not only outputs from CPUs 5 (as is conventional), but are common input/output terminals. In addition, the burst ready signal BRDY# pin, which is an input only in conventional Pentium-class CPUs, is also a common input/output terminal in CPUs 5 according to this embodiment of the invention. In this embodiment of the invention, address status signal ADS# and burst ready signal BRDY# may be implemented at multiple terminals, separately driven and received from one another to reduce loading effects. FIG. 3 illustrates this implementation with address status signal pins ADS# and ADSC# and burst ready signal pins BRDY# and BRDYC#; for purposes of this description, address status signal ADS# will refer collectively to pins ADS# and ADSC#, and burst ready signal BRDY# will refer collectively to pins BRDY# and BRDYC#. CPUs 5 according to this embodiment of the invention are thus able to receive input signals on each of the pins memory/IO select M/IO#, address status signal ADS#, data/control select D/C#, write/read select W/R#, locked bus cycle indication signal LOCK#, split cycle select SCYC, and byte enable signals BE7#-BE0#, and present an output signal on pin burst ready signal BRDY#. FIG. 3 illustrates this capability, in which exemplary BIU 8 has a driver/receiver pair 30 associated with each of its input/output pins M/IO#, D/C#, W/R#, ADS# (and ADSC#), LOCK#, SCYC, CACHE#, BRDY# (and BRDYC#), and BE7# through BE0#. Driver/receiver pairs 30 are in communication with bus logic 27 in BIU 8 by way of input bus BUSIN and output bus BUSOUT; bus logic 27 is, in turn, in communication with the rest of CPU 5, such as level 2 cache 6, via internal bus BUSINT.

Also as shown in FIG. 3, BIU 8 includes inter-processor arbitration logic 29 which is in bi-directional communication with inter-processor arbitration bus IPARB, and thus in direct communication with the others of CPUs 5 in system 2. The specific operation of the signals in inter-processor arbitration bus IPARB, and the response to and generation of signals thereon by CPUs 5 will be described in further detail hereinbelow.

Figure 4:
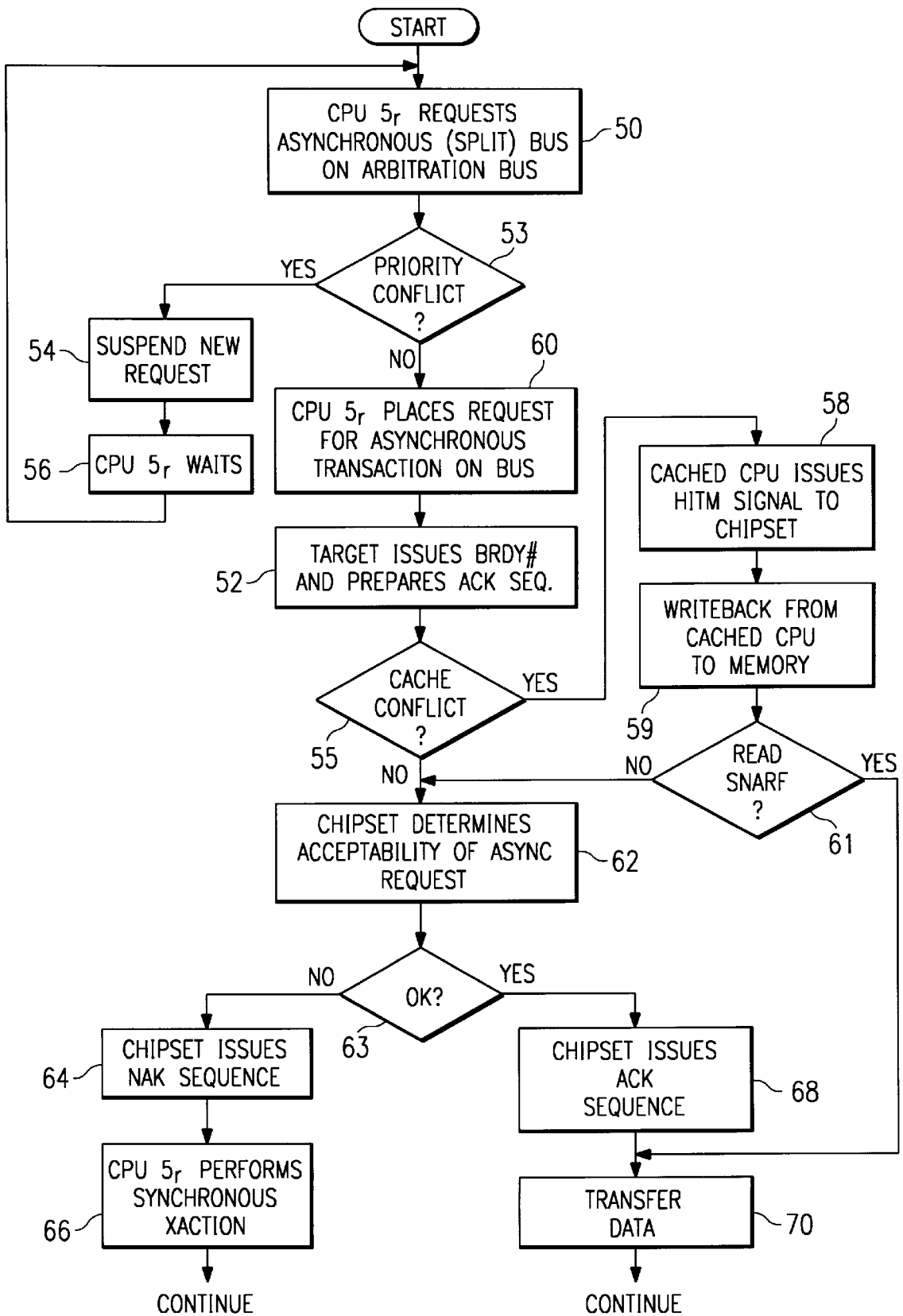
FIG. 4 is a flow chart illustrating the operation of the asynchronous bus transaction protocol according to a first preferred embodiment of the invention.

Referring now to FIG. 4, in combination with FIGS. 5a and 5b, the operation of system 2 according to this first preferred embodiment of the present invention will now be described in detail. This description will be made for the example of a memory access (either a read or a write), as it is contemplated that most asynchronous transactions will be memory accesses. It is contemplated that one of ordinary skill in the art having reference to this description will be readily able to implement the present invention in microprocessor-based systems for I/O operations and the like.

According to this first embodiment of the invention, an asynchronous, or split, transaction cycle begins with process 50, in which a requesting CPU $5_r$ initiates an asynchronous transaction by first presenting a transaction request on inter-processor arbitration bus IPARB. Each of CPUs 5 receive this request and then determine whether a priority conflict has arisen because of the request made in process 50. If such a priority conflict exists, meaning that multiple ones of CPUs 5 are concurrently requesting an asynchronous bus transaction (or that another priority conflict has arisen), CPUs 5 arbitrate the conflict according to a predetermined priority order among the CPUs 5. As shown in FIG. 1, inter-processor arbitration bus IPARB is interconnected directly among CPUs 5 to accomplish the arbitration. For example, inter-processor arbitration bus IPARB may include a conductor assigned to each of CPUs 5 to carry a request signal associated therewith (issued at the time of the asynchronous request of process 50), at least one control conductor for carrying a signal defining the initiation of a valid arbitration signal, and a pair of conductors to carry a CPU identifier code (in the case of no more than four CPUs 5 in system 2, as is the case here) that indicates the one of the simultaneously requesting CPUs 5 that has the highest priority (i.e., that "wins" the priority arbitration). If the new request of process 50 producing a priority conflict with a higher priority operation, such that requesting CPU 5$_r$ "loses" the priority arbitration, requesting CPU 5$_r$ then suspends its request in process 54, and waits (process 56) until such time as it again issues the request in process 50. Of course, it is contemplated that other arbitration methods, such as those known in the art for multiprocessor arbitration, may alternatively be used.

If no priority conflict is determined in decision 53, requesting CPU 5$_r$ requests an asynchronous bus transaction, shown in process 60 of FIG. 4. FIGS. 5a and 5b each illustrate the timing and signals presented by CPU 5$_r$ in requesting an asynchronous bus transaction, according to this embodiment of the invention. In order to maintain minimum pin count and plug-compatibility for CPUs 5, it is preferred that the asynchronous bus transaction request be performed by CPU 5r by way of a previously unused signal combination. In this embodiment of the invention, the asynchronous bus transaction request is made by CPU 5$_r$ presenting the following combination of signals as outputs:

| Operation   | M/IO# | D/C# | W/R# | SCYC |
|-------------|-------|------|------|------|
| Split read  | 1     | 0    | 1    | 0    |
| Split write | 1     | 0    | 1    | 1    |

These signal combinations are not assigned to any conventional Pentium-class microprocessor signal definition, and as such are available combinations according to the P54C bus protocol. The presentation of these signals by CPU 5$_r$ to effect an asynchronous bus transaction request in process 50 is illustrated in each of FIGS. 5a and 5b, in bus cycle BC0, strobed by address status signal ADS# (generated by CPU 5$_r$). The SCYC signal, which indicates whether a read or write operation is requested, is shown as being valid in either state in FIGS. 5a and 5b.

Also in connection with the above signals, CPU 5$_r$ issues either a "0" or "1" level on its LOCK# pin to indicate whether 32-bytes (LOCK#=0) or 64-bytes (LOCK#=1) are requested. It is contemplated that the split, or asynchronous, bus transactions requested by CPUs 5 in system 2 according to this embodiment of the invention will generally be burst accesses, considering that there is little bus efficiency gained by performing single transactions (i.e., single data word accesses) in split fashion. The cache request signal CACHE# (not shown in FIG. 5a) is also driven by CPU 5$_r$ in the conventional manner for the P54C protocol, depending upon whether or not a cacheable access is to be requested. In addition to the above-noted signal combinations, CPU 5$_r$ also presents, in process 50, an address on address bus ABUS to indicate the memory location to which access is requested in the asynchronous transaction (shown as memory address ADDR$_i$ in FIGS. 5a and 5b).

Figure 5A:
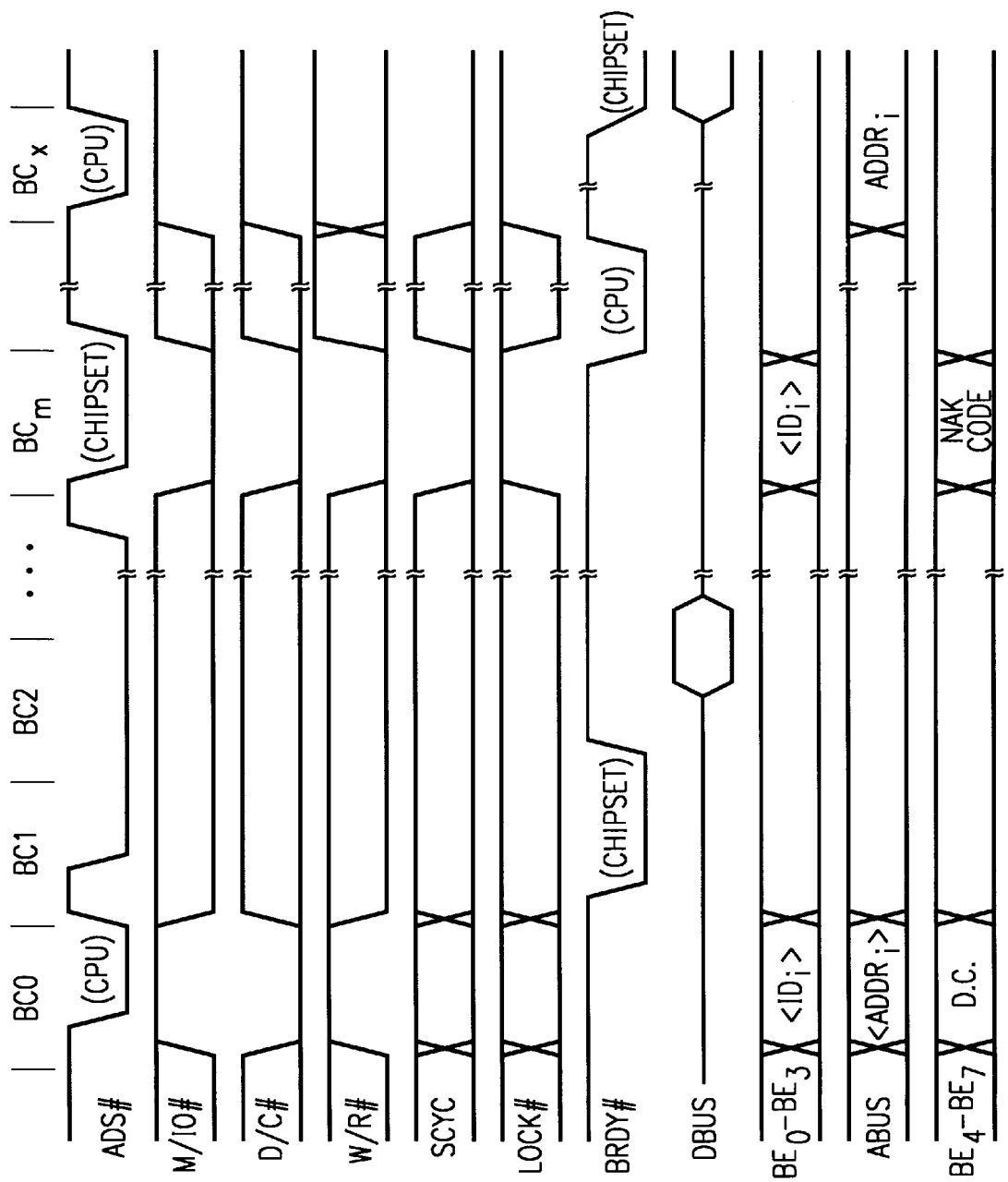
FIGS. 5a and 5b are timing diagrams illustrating the operation of accepted and non-accepted asynchronous bus transactions according to the first preferred embodiment of the invention.
Figure 5B:
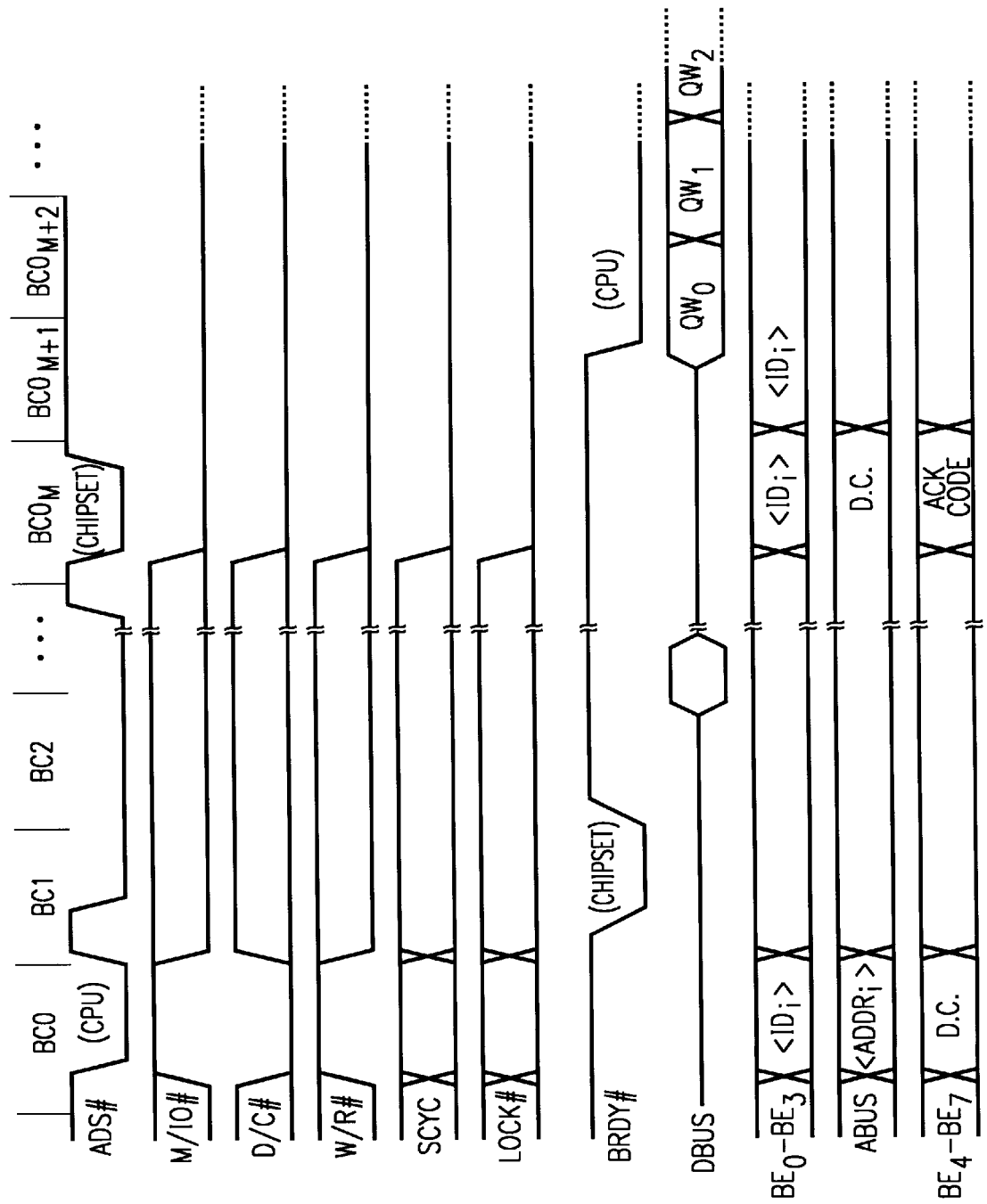

CPU 5$_r$ also presents an asynchronous bus transaction identifier on byte enable lines BE0# through BE3#, as shown by the value ID$_i$ in FIGS. 5a and 5b, simultaneously with and in the same bus cycle as the address on address bus ABUS. Byte enable signals BE0# through BE3# are available for this use as a transaction identifier, considering that the asynchronous bus transaction requested is a burst operation of up to 64 bytes of access and thus no starting byte address is to be presented. In this example of the invention, four of the byte enable signals BE# are used as the transaction identifier, resulting in up to sixteen possible pending split transactions in system 2. Of course, additional bits of transaction ID may be presented to provide more than sixteen possible outstanding transactions; particularly, since the two byte enable signals BE4# and BE5# are not used in the acknowledge sequence as will be described below, the present implementation can readily allow up to sixty-four outstanding asynchronous transactions. In addition, use of the byte enable signals for presentation of the transaction identification code allows all address bits to be used in presenting the address, thus enabling the entire memory address space of the system to be accessible by way of an asynchronous transaction.

The transaction identification code is preferably assigned by the requesting CPU 5$_r$. Specific transaction identifiers may be assigned to each of the CPUs 5 in system 2 so that a given request identifier may only be issued by a single CPU 5. Alternatively, each of CPUs 5 may have logic in its BIU 8 to keep track of the pending transactions issued by the other CPUs 5, and then assign the next sequential identifier to its own request and present the same on byte enable signals BE0# through BE3#; according to this scheme, the number of possible pending split transactions per CPU 5 is not fixed, thus allowing flexibility in the use of these transactions among the multiple CPUs 5.

According to the above-described definition of the use of the byte enable signals BE3# through BE0# in communicating the transaction identifier ID$_i$ only block access transactions are available for asynchronous operation. Alternatively, the byte enable signals may be encoded with a byte starting address for non-block asynchronous transactions, according to the following arrangement:

| BE# pins     | Definition                                   |
|--------------|----------------------------------------------|
| BE0#–BE3#    | Transaction identifier (ID$_i$)              |
| BE4#         | Length [e.g., 0 = 4 bytes; 1 = 8 bytes]      |
| BE5#–BE7#    | Encoded byte starting address                |

The encoded byte starting address would be a three-bit binary value corresponding to address bits A0 through A2, indicating the one of eight bytes at which the access is to begin.

In response to the request of process 60, the target device in chipset 27 (e.g., memory controller 10 for an access to main memory 21) asserts the burst ready signal BRDY#, in process 52 as shown in bus cycle BC1 of FIGS. 5a and 5b. As is conventional for P54C bus transactions, at least one cycle of the BRDY# signal must be asserted in response to any assertion of the address status signal ADS#, so that the bus is released for the next transaction. In this embodiment of the invention, each asynchronous transaction will receive a single BRDY# signal, even if the requested transaction is a burst or cacheable access. The target device then begins preparation of its acknowledge sequence, which will be described hereinbelow.

According to this preferred embodiment of the invention, each of CPUs 5 in the system preferably monitor the bus, or "snoop", all bus transaction requests including asynchronous transaction requests, to determine, in decision 55, whether a cache conflict is presented by the request made in process 60. Specifically, since each of CPUs 5 have level 1 and level 2 on-chip cache memories 6, 16 which are operable in a writeback mode, the contents of main memory 21 may not be the most up-to-date copy of a memory location; instead, one of CPUs 5 other than the requesting CPU 5$_r$ may contain the most up-to-date contents for the memory location $ADDR_i$ requested in process 60. If this is the case, control passes to process 58 in which the one of CPUs 5 having the valid information in its cache indicates to memory controller 10, for example by way of its hit modified line HITM# output signal (which is conventional for Pentium-class microprocessors), that a cache writeback operation is necessary to update main memory 21. Process 59 is then performed by the cached one of CPUs 5 to write the contents of its cache that contains the requested address $ADDR_i$ to main memory 21. Of course, snooping CPUs 5 should take the appropriate action to maintain memory system coherency.

According to an alternative embodiment of the invention, each of CPUs 5 in system 2 may have an additional input terminal connected to the HITM# output terminals of the other ones of CPUs 5 in system 2. This additional interconnection alerts the requesting CPU $5_r$ to the cache conflict so that, if the requested transaction is a read operation, requesting CPU $5_r$ may "snarf" data bus DBUS during the writeback of the data from the cache to main memory 21 to also receive the writeback data, which is also the data requested. Referring to FIG. 4, this determination is made in decision 61. If decision 61 returns a YES, meaning that the request of process 60 was a read, that a writeback operation is occurring and that requesting CPU $5_r$ can "snarf" the data from data bus DBUS, process 70 is performed to effect the data transfer to requesting CPU $5_r$ during the writeback, following which the asynchronous transaction requested by CPU $5_r$ is terminated because the requested access is complete. Chipset 27 is preferably alerted to the snarfing operation of requesting CPU $5_r$, and no acknowledge or non-acknowledge sequence will be performed.

Referring back to FIG. 4, if the request of CPU $5_r$ in process 50 did not cause a cache conflict, or after writeback in the event of a cache conflict in which snarfing was not available (e.g., the requested transaction was a write), control passes to process 62 in which memory controller 10 determines whether the transaction requested in process 60 may be performed in a split, or asynchronous, manner. The requested transaction may not be acceptable as a split transaction for several reasons. For example, a requested memory access may not be performable as a burst operation, due to the particular function of the accessed memory location (e.g., the memory-mapped control register). Similarly, if a sixty-four byte asynchronous access is requested of a memory location in which the burst access length is only thirty-two bytes, the requested transaction is not acceptable (but may only be performable in part, such as by way of a thirty-two byte access). Those portions of the system memory space in which these transactions are prohibited are preferably programmed into registers of memory controller 10, similarly as conventionally done to define non-cacheable portions of the memory space. Other reasons for not accepting the transaction include such events as bus errors and the like, which may be determined by memory controller 10 by way of its bus logic, conventionally contained therein. Referring back to FIG. 4, the target device in chipset 27 (e.g., memory controller 10 in the event of an access to main memory 21) determines whether the requested transaction is to be accepted in decision 63.

Meanwhile, other bus cycles may be performed by system 2 during the acceptability determination of process 62 and decision 63, as illustrated in FIGS. 5a and 5b for bus cycles BC1, BC2, et seq. These intervening cycles may be synchronous bus transactions requested or performed by any of CPUs 5 (including the currently requesting CPU $5_r$), and may also be the completion of outstanding (i.e., previously requested and accepted) asynchronous bus transactions for any of CPUs 5, including those of requesting CPU $5_r$, and also including new asynchronous transfer requests from the other CPUs 5. As shown in FIGS. 5a and 5b, these intervening transactions cause traffic on the buses, illustrated by the activity on data bus DBUS in bus cycles BC1, BC2.

In the event that memory controller 10 determines that the asynchronous bus transaction requested in process 60 is not acceptable, control passes to process 64, in which memory controller 10 (or the other appropriate chipset device, depending upon the transaction requested) issues a non-acknowledge sequence to the requesting CPU $5_r$. FIG. 5a illustrates the timing and signals of the non-acknowledge sequence according to the preferred embodiment of the invention, as will now be described.

As described hereinabove relative to FIG. 3, certain of the pins of CPUs 5 are, according to this embodiment of the invention, common input/output terminals, and as such are able to receive and respond to signals presented to these pins by memory controller 10. In this exemplary implementation, the non-acknowledge sequence is issued by chipset 27 (e.g., memory controller 10) in process 64 by placing the following states on these input/output pins for receipt by the requesting CPU $5_r$, in combination with chipset 27 asserting the address status pin ADS#:

| M/IO# | D/C# | W/R# | SCYC | LOCK# | CACHE# |
|-------|------|------|------|-------|--------|
| 0     | 0    | 0    | 0    | 1     | 0      |

This combination of signals presented by chipset 27 is accompanied by an identification code presented on byte enable signals BE7# through BE0# according to the following definitions for the non-acknowledge operation:

| BE# pins  | Definition |
|-----------|------------|
| BE0#–BE3# | Transaction identifier ($ID_i$) |
| BE4#–BE5# | [Reserved] Set to 0 |
| BE6#–BE7# | 00: Access is not burstable |
|           | 01: Length >32 bytes not supported |
|           | 10: Bus not available; try later |
|           | 11: Bus error |

These byte enable signal codes, presented by chipset 27 during bus cycle $BC_m$ shown in FIG. 5a in this example, are received and acted upon by the one of CPUs 5 that requested the split transaction identified by byte enable signals BE0# through BE3#. In the example described herein, where CPU $5_r$ issued the request in process 60, CPU $5_r$ then performs a synchronous transaction in process 66 to effect the desired access, particularly if the rejection code on byte enable signals BE6# and BE7# is 00 (not burstable). Of course, CPU $5_r$ may instead wait for a specified time and then again attempt the asynchronous transaction at a later time, particularly if the rejection code on byte enable signals BE6# and BE7# indicate bus error (11) or that CPU $5_r$ is to wait (10). The performance of the synchronous transaction of process 66 is made using conventional P54C bus signals, as shown in bus cycle $BC_x$ of FIG. 5a, where requesting CPU $5_r$ asserts address status signal ADS# in combination with the address value $ADDR_i$ and the appropriate P54C control signals for performing the synchronous access. The operation of requesting CPU $5_r$ then continues as appropriate, as indicated in FIG. 4.

If the target device in chipset 27 (e.g., memory controller 10) determines, in process 62 and decision 63, that the asynchronous request made by CPU $5_r$ in process 60 is to be accepted, control passes to process 68 in which chipset 27 (i.e., memory controller 10, in this example) issues the acknowledge sequence to CPU $5_r$, which will now be described in detail relative to FIG. 5b. In this case, after any intervening cycles as noted above, memory controller 10 issues the acknowledge sequence, shown in bus cycle $BC_m$ of FIG. 5b, by the following combination of signals presented by chipset 27 along with assertion of address status signal ADS#:

| M/IO# | D/C# | W/R# | SCYC | LOCK# | CACHE# |
|---|---|---|---|---|---|
| 0 | 0 | 0 | 0 | 0 | 0 | which is accompanied by an identification code presented on byte enable signals BE7# through BE0# according to the following definitions for the acknowledge operation:

| BE# pins | Definition |
|---|---|
| BE0#–BE3# | Transaction identifier ($ID_i$) |
| BE4#–BE5# | [Reserved] Set to 0 |
| BE6#–BE7# | 00: OK |
| | 01: Access is burstable, but not cacheable |
| | 10: [not defined] |
| | 11: [not defined] |

As before, each of these terminals ADS#, M/IO#, D/C#, W/R#, SCYC, CACHE#, LOCK#, BRDY#, and BE7# through BE0#, are input/output terminals in CPUs 5, as shown in FIG. 3 discussed above.

As indicated in the above table, certain combinations of byte enable signals BE6# and BE7# are not defined; as such, capacity is present to provide additional functionality if desired. For example, one of these available codes could be used to indicate, to requesting CPU $5_r$, that a requested sixty-four byte access is not supported, but that an asynchronous transaction of the first thirty-two bytes requested will be performed instead; requesting CPU $5_r$ would thus receive part of the requested access, and would know to request the remainder of the access in a subsequent transaction.

In this embodiment of the invention, the acknowledge sequence generated by chipset 27 implicitly indicates that the transaction will occur in the next succeeding bus cycles, and that the target device in chipset 27 can effect the data transfer (read or write) at the highest rate that can be handled by requesting CPU $5_r$. Upon receipt of these signals by requesting CPU $5_r$, indicating acceptance of the asynchronous transaction, control then passes to process 70 to effect the data transfer. In process 70, CPU $5_r$ identifies the accepted asynchronous bus transaction $ID_i$ as corresponding to its outstanding asynchronous access request. As shown in FIG. 5b, bus cycle $BC_m$ is a bus cycle in which chipset 27 begins performing the access requested by CPU $5_r$ in process 60, for transaction $ID_i$. As shown in FIG. 5b, memory controller 10 again presents the acknowledge code of signals M/IO#, D/C#, W/R#, SCYC, CACHE#, and LOCK# all in their low logic level (indicating that this bus cycle is one of the cycles corresponding to the requested asynchronous transaction), in combination with chipset 27 asserting the address status signal ADS#. Requesting CPU $5_r$ then asserts burst ready signal BRDY# in response to recognition of the acknowledge sequence corresponding to one of its outstanding asynchronous transactions, and to indicate the transfer of data.

As soon as address status signal ADS# and the above-described acknowledge code is indicated, the agent providing data in the transaction (i.e., CPU $5_r$ for a write, or the target in chipset 27 for a read) begins providing data on the next clock and continues the data transfer until all data for the transaction has been transferred (or the transfer is aborted by standard mechanisms). This is shown in FIG. 5b by the burst ready signal BRDY# in combination with valid data quad words $QW_0$, $QW_1$, et seq. presented on data bus DBUS in bus cycles $BC_x$, $BC_{x+1}$, et seq. Of course, the order of quad words QW in the actual access will depend upon the particular starting address presented in the request of process 60 (i.e., quad words QW may not be presented in address value sequence). The asynchronous transaction thus continues until completed, at the end of the particular access requested, indicated by the deassertion of burst ready signal BRDY# by requesting CPU $5_r$.

According to this embodiment of the invention, therefore, asynchronous or split transactions are enabled in system 2 by using signals and control bus CBUS conductors that are already present in the P54C bus protocol. Explicit requests for asynchronous transactions are made by the requesting CPU 5 in this embodiment of the invention, to which the control logic and chipset 27 respond by either accepting or not accepting the explicitly requested transaction. This first preferred embodiment of the invention is applicable and beneficial both in multiprocessor environments, and also in single CPU environments where the CPU has out-of-order execution capability.

A second embodiment of the invention will now be described, in which a requesting CPU $5_r$ requests an asynchronous transaction, in a similar manner as described hereinabove, but where chipset 27 provides an early indication of the acceptability of the transaction. This early indication allows those transactions that chipset 27 determines cannot be performed in an asynchronous manner to be performed synchronously in an immediate manner.

Figure 6:
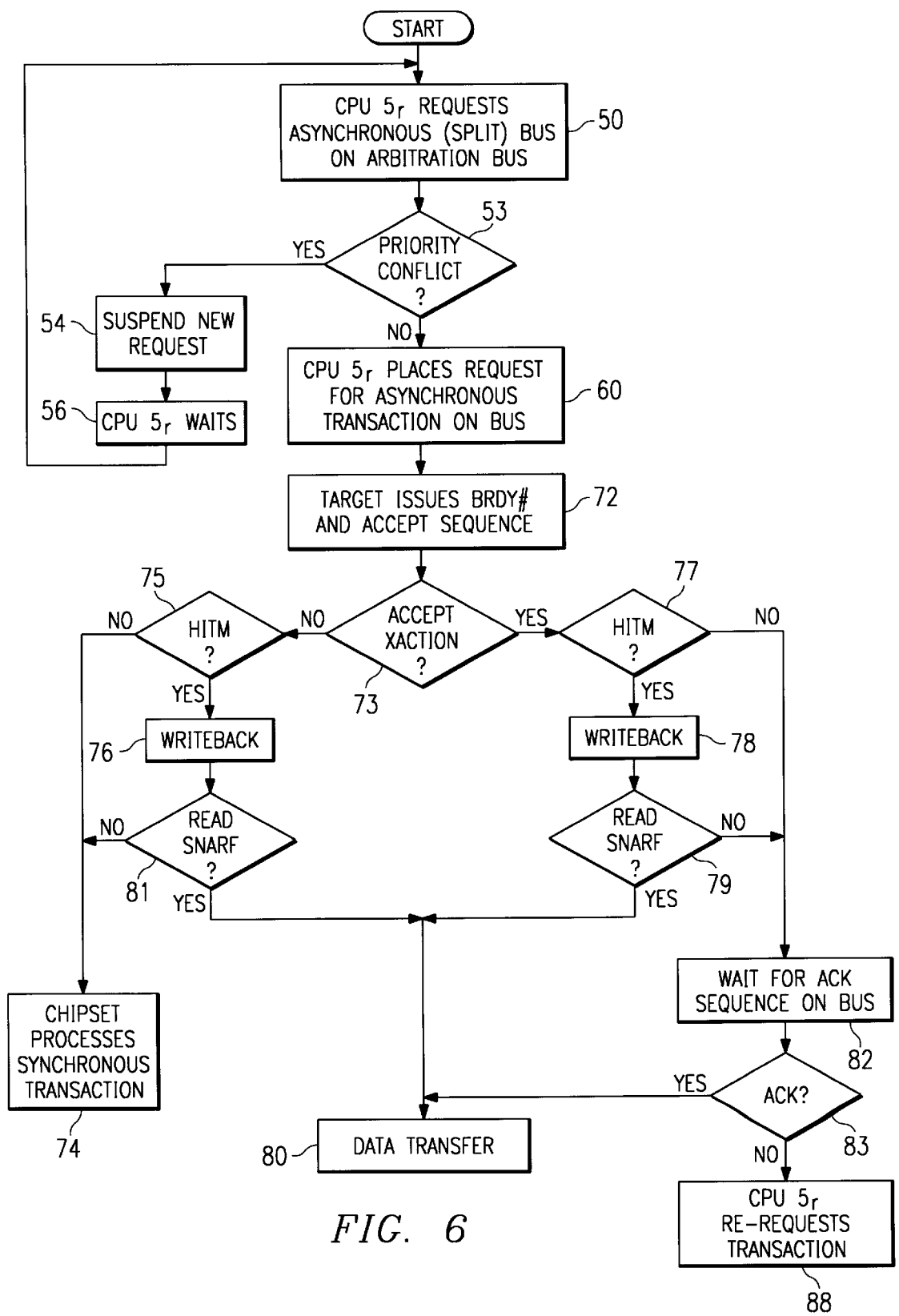
FIG. 6 is a flow chart illustrating the operation of the asynchronous bus transaction protocol according to a second preferred embodiment of the invention.

The operation of system 2 is, in the general sense and as shown in FIG. 6, similar to that shown in FIG. 4 and described hereinabove; similar process and decision blocks as described above relative to FIG. 4 will therefore be referred to in FIG. 6 by the same reference numerals. However, the signals and timing of the signals used in the generation of the asynchronous transaction differ in this second preferred embodiment of the invention from those described above. Referring now to FIG. 6 in combination with FIG. 7, the operation of this embodiment of the invention will now be described.

The method begins with requesting CPU $5_r$ issuing a request for an asynchronous transaction in process 60 (after priority arbitration decision 53), as before. According to this second embodiment of the invention, as shown in bus cycle BC0 of FIG. 7, this request of process 60 is made in the same manner as described hereinabove relative to FIGS. 5a and 5b. Particularly, the transaction identifier is issued by requesting CPU $5_r$ simultaneously with and in the same bus cycle as the presentation of the address value on address bus ABUS.

In response to the request of process 60, in this embodiment of the invention, the target device in chipset 27 provides an early indication of the acceptance or non-acceptance of the requested transaction, along with its assertion of burst ready signal BRDY#, in process 72.

The determination of process 72 is made in a similar manner as described above relative to FIG. 4. In general, the appropriate one of controllers 10, 12, 14 in chipset 27 receives the request and determines if the location or operation requested may be performed in an asynchronous manner; this is done, for the example of a main memory access, by memory controller 10 determining if the control signals applied by CPU $5_r$ are consistent with an asynchronous transaction, and by comparing the address value $ADDR_i$ presented by CPU $5_r$ to the contents of its programmable registers to determine if the requested address falls within portions of the memory space for which burst access is to be precluded. In this example, the target device in chipset 27 issues the accept or non-accept code in the next bus cycle (bus cycle BC1 of FIGS. 7a and 7b), in combination with the burst ready signal BRDY# (or, alternatively, the next address signal NA#, as the case may be). The accept or not-accept combination is then interrogated by CPU $5_r$ in decision 73.

Figure 7A:
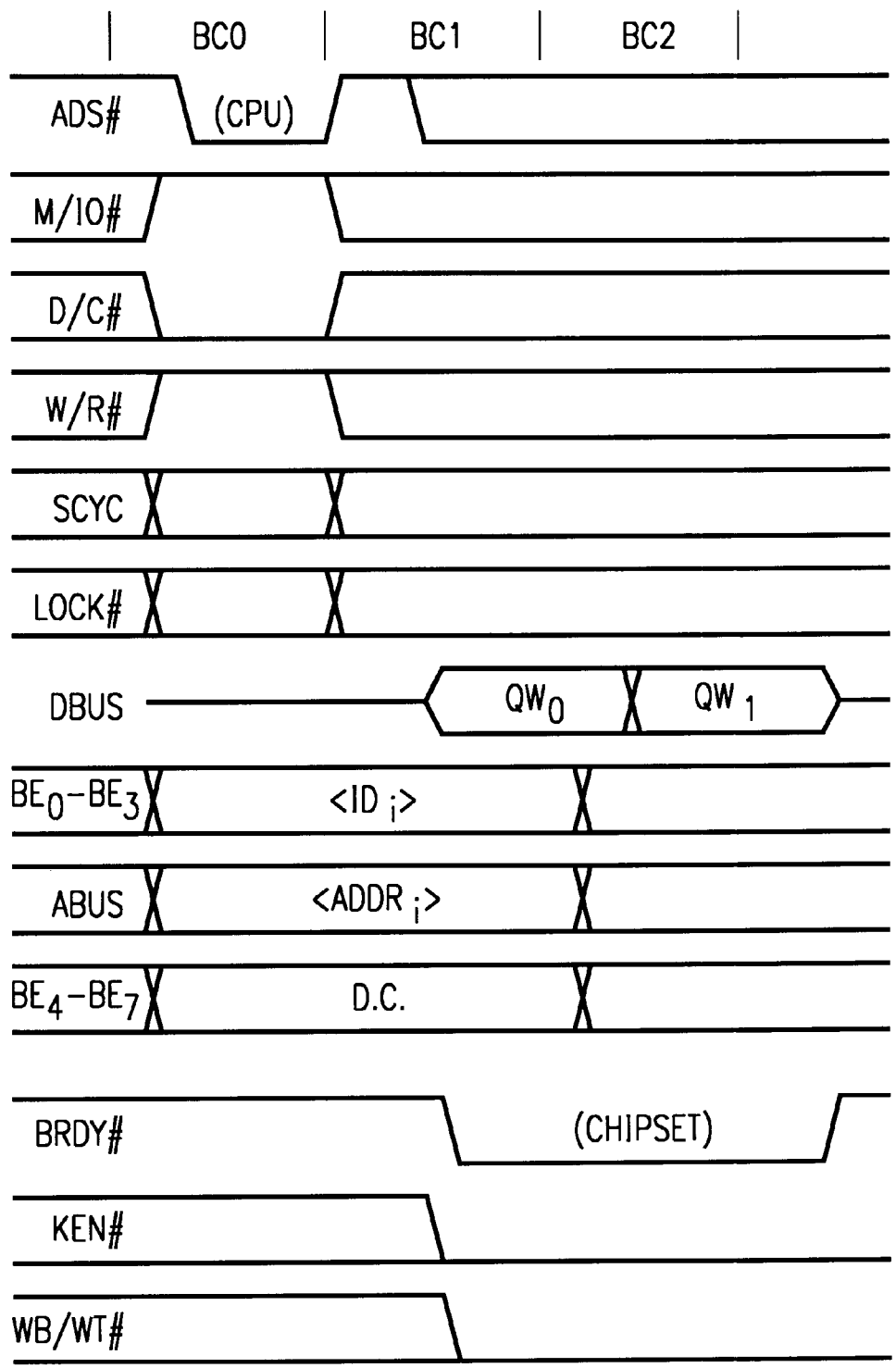
FIGS. 7a and 7b are timing diagrams illustrating the operation of not-accepted and accepted asynchronous bus transactions, respectively, according to the second preferred embodiment of the invention.

According to this embodiment of the invention, if process 72 determines that the access requested by requesting CPU $5_r$ is not to be performed asynchronously, a non-acceptance sequence is presented by chipset 27 to requesting CPU $5_r$ by the usual synchronous bus transaction control signals presented by the appropriate controller in chipset 27, such control signals including the presentation of the cache enable control signal KEN# at the appropriate state to indicate the cacheability of the access, valid at the time at which chipset 27 issues burst ready BRDY# signal, (or the next address NA#, depending upon which response is appropriate for the request). This not-accept sequence is shown in FIG. 7a, and is interpreted in decision 73 by requesting CPU $5_r$.

If hit modified signal HITM# is not asserted by any of the other CPUs 5 in the system (decision 75 is NO), or if hit modified signal HITM# is asserted but snarfing is not available during the writeback of process 76 (decision 81 is NO), control passes to process 74 in which a synchronous transaction is processed by chipset 27 according to the access requested in process 60. An example of this operation is illustrated in FIG. 7a, where the not accept sequence is indicated in bus cycle BC1 by the target device in chipset 27 (e.g., memory controller 10) asserting line KEN# in combination with driving line WB/WT# low at the time that it asserts burst ready signal BRDY#. This example of a non-accept sequence indicates to requesting CPU $5_r$ that the requested access is not cacheable, in a manner corresponding to conventional P54C protocol. Also in this bus cycle BC1, however, chipset 27 processes the requested transaction as a synchronous transaction, either presenting data on or receiving data from data bus DBUS (shown as quad words $QW_0$, $QW_1$ in FIG. 7a), in the conventional manner.

As is evident from the foregoing description, this embodiment of the invention provides the benefit of immediately performing at least a portion of the requested transaction in a synchronous manner if the transaction cannot be performed as split cycles. The overall performance of the system is thus further improved, as the requesting CPU $5_r$ need not re-request the desired transaction if asynchronous operation is not available.

Figure 7B:
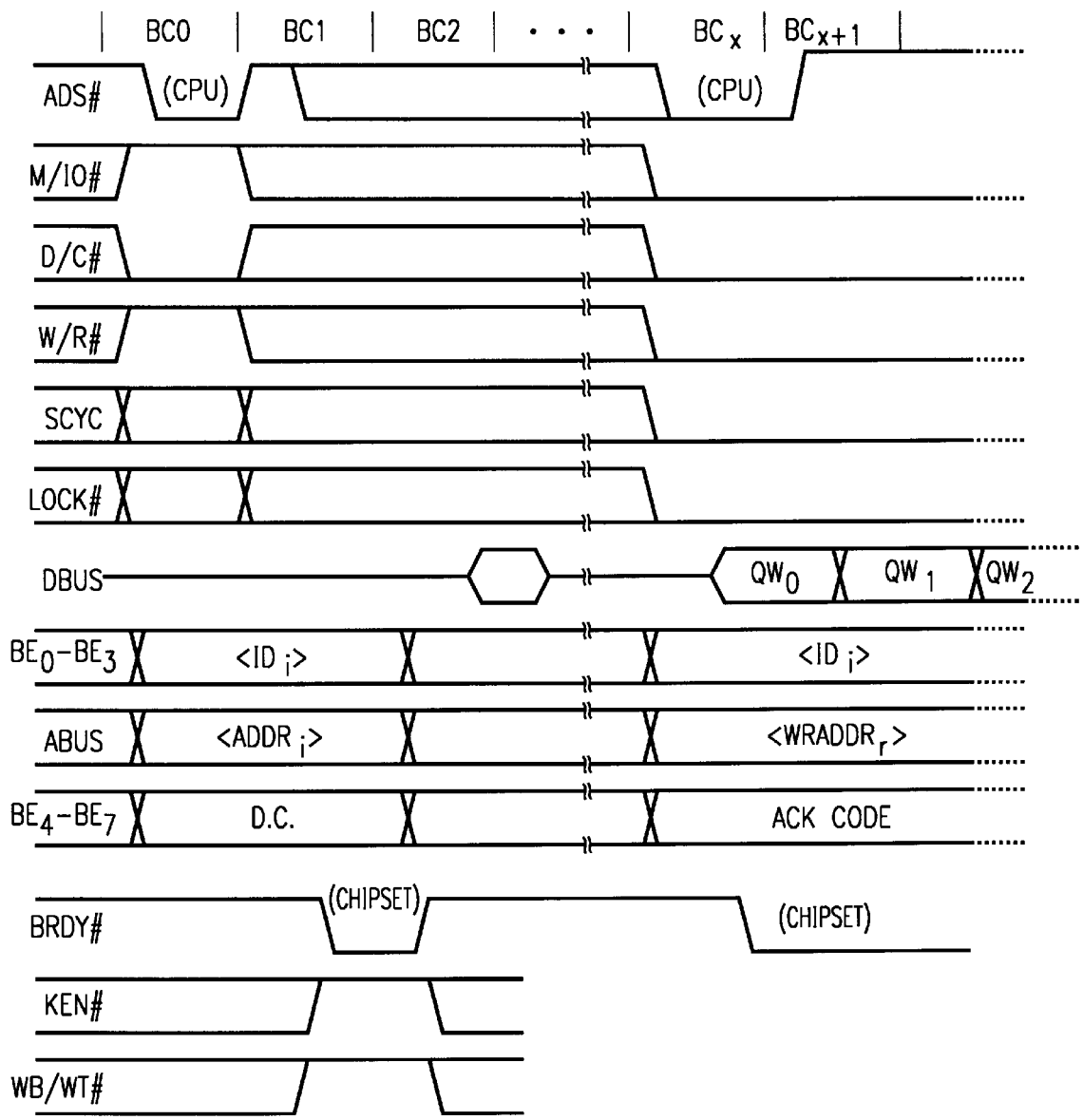

According to this embodiment of the invention, in the event that chipset 27 determines, in process 72, that the requested access may be performed in an asynchronous, or split, bus transaction, chipset 27 will issue an accept signal combination in process 72, detected by requesting CPU $5_r$ in decision 73. In this example, the accept combination is performed in bus cycle BC1 immediately following the request operation in bus cycle BC0 (of course, the accept combination may be delayed by delaying assertion of the BRDY# signal). As shown in FIG. 7b in bus cycle BC1, the acknowledge sequence presented by the appropriate controller in chipset 27 consists of the following combination of signals presented on control bus CBUS upon the earlier of chipset 27 asserting either the burst ready signal BRDY# or the next address signal NA#:

| KEN# | WB/WT# |
|---|---|
| 1 | 1 |

This combination of signals is a don't care combination according to conventional P54C bus protocol, and as such is available for use as the accept combination.

Following the issuance of the accept combination in process 72 by chipset 27, the operation of the asynchronous transaction proceeds substantially in the manner described hereinabove relative to FIGS. 4 and 5b. Other transactions may then take control of the bus, until such time as the access requested in process 60 is available, as shown in FIG. 7b. Meanwhile, as described above, the other CPUs 5 in system 2 will snoop the requested access to determine if a cache conflict occurs. If the access is to a cached address in one of the other CPUs 5 in which the contents have been modified but not written back to main memory, the caching CPU 5 will assert the hit modified signal HITM#, detected by requesting CPU $5_r$ in decision 77. If line HITM# is asserted, writeback process 78 is performed and decision 79 determines if requesting CPU $5_r$ is able to perform a snarf of the writeback data (in the case of a read cycle), in which case it receives the data in data transfer process 80 as before.

If no cache conflict is indicated, or if one is indicated but snarfing is not available, requesting CPU $5_r$ snoops the bus (process 82 and decision 83) to wait for the asynchronous request identifier $ID_i$ to appear on the byte enable pins BE3# through BE0#, in combination with the acknowledge code presented by the following combination of signals in combination with chipset 27 asserting address status signal ADS#:

| M/IO# | D/C# | W/R# | SCYC | LOCK# | CACHE# |
|---|---|---|---|---|---|
| 0 | 0 | 0 | 0 | 0 | 0 | which is the same signal combination as used in the first embodiment of the invention described above. This signal combination is accompanied by an identification code presented on byte enable signals BE7# through BE0# according to the following definitions for the acknowledge operation, which are the same as described above relative to FIG. 5b:

| BE# pins | Definition |
|---|---|
| BE0#–BE3# | Transaction identifier ($ID_i$) |
| BE4#–BE5# | [Reserved] Set to 0 |
| BE6#–BE7# | 00: OK |
| | 01: Access is burstable, but not cacheable |
| | 10: [not defined] |
| | 11: [not defined] |

Requesting CPU $r_r$, in this case, has its byte enable pins BE7# through BE0# and also its M/IO#, D/C#, W/R#, SCYC, ADS#, BRDY#, CACHE#, and LOCK# pins configured as common input/output terminals, as described above relative to FIG. 3. As before, the undefined codes may be used to indicate other operations, such as the case where a sixty-four byte access is requested but not supported, such that the asynchronous transaction is granted but only up to a maximum of a thirty-two byte transaction. Referring to FIG. 7b, the acknowledge sequence is shown relative to bus cycles $BC_x$, $BC_{x+1}$, et seq., during which the asynchronous transaction is performed as evident by requesting CPU $5_r$ asserting burst ready signal BRDY#, and by quad words $QW_0$, $QW_1$, et seq. driven on data bus DBUS. The asynchronous transaction thus continues until complete, in process 80.

However, decision 83 indicates that a non-acknowledge sequence may be generated by the target device in chipset 27 in similar manner as described hereinabove relative to FIG. 5a, despite the early indication of the acceptance of the transaction. If this occurs, control passes to process 88 in which requesting CPU $5_r$ must again request the transaction; depending upon the reason for the non-acknowledge (as indicated by the NAK sequence), CPU $5_r$ may re-request the transaction as a synchronous transaction.

According to this second embodiment of the invention, therefore, an early indication of the acceptability of the requested asynchronous transaction is provided, which allows for the immediately successive cycles to effect the requested transaction in a synchronous (i.e., non-split) manner. It is contemplated that this embodiment of the invention will thus maximize the performance of system 2, particularly for those situations in which bus traffic is high.

Figure 8:
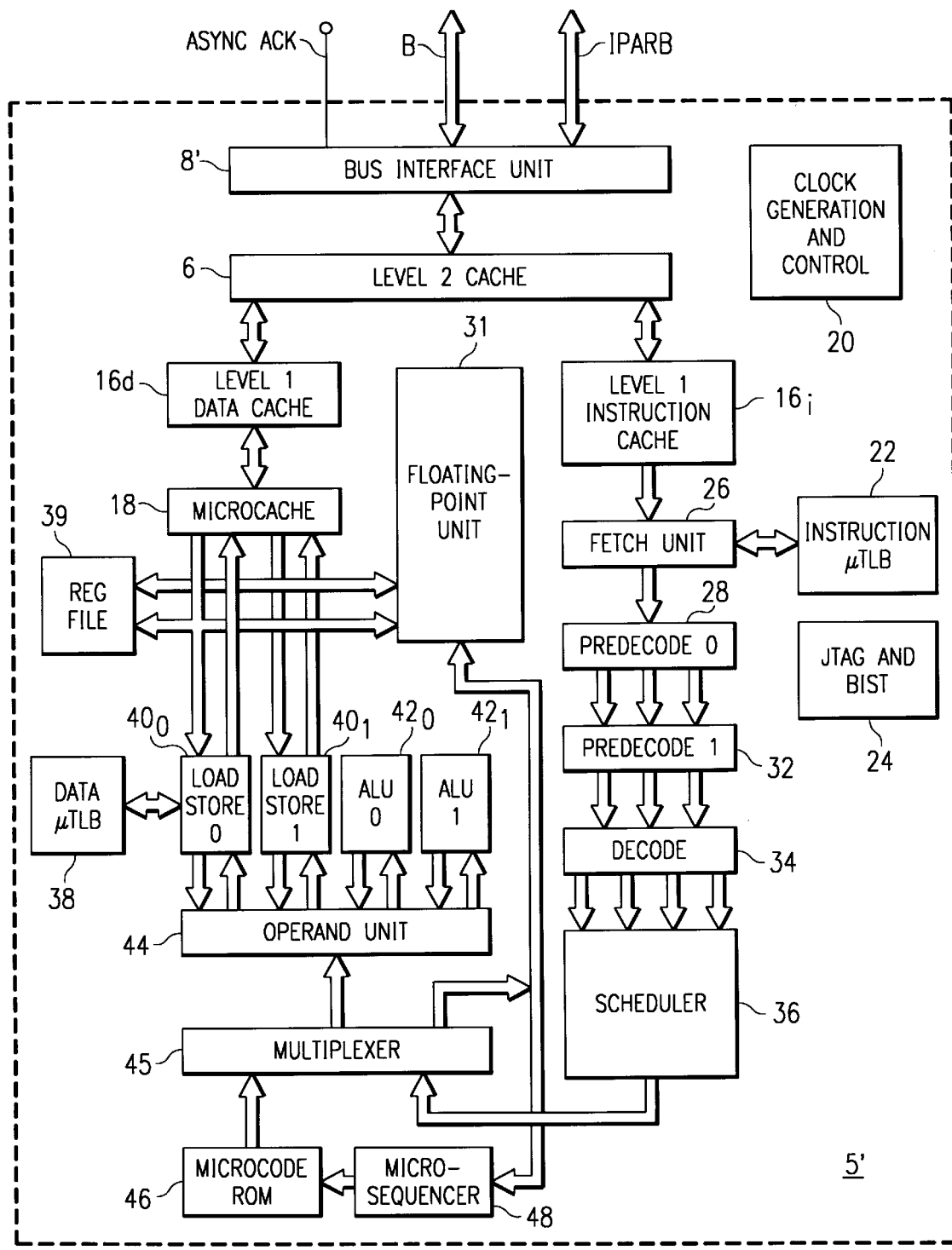
FIG. 8 is an electrical diagram, in block form, of the internal architecture of the microprocessor CPUs in the system of FIG. 1 according to an alternative embodiment of the invention.

Further in the alternative, for either of the above embodiments of the invention, if an extra terminal is made available on CPUs 5 and connected into control bus CBUS, the acknowledge sequence may be indicated by way of a separate signal. An example of this embodiment of the invention is illustrated in FIG. 8, in which CPU 5' is illustrated having BIU 8'. In his embodiment of the invention, BIU 8' receives an asynchronous acknowledge signal at terminal ASYNC ACK, which is connected to a new conductor in control bus CBUS driven by chipset 27.

In any of the above-described embodiments, it may be beneficial to have the ability to selectively enable and disable the asynchronous request sequence. Disabling of the asynchronous request sequence would ensure total compatibility with P54C bus protocol when executing certain programs, or when implemented in combination with chipsets that do not support asynchronous transactions. Referring back to FIG. 2, it is contemplated that one or more bit positions in a control register in register file 39 would be made available to store a flag indicating whether asynchronous transactions are to be enabled or disabled, as the case may be. Such enabling and disabling may thus be performed under program control.

The embodiments of the present invention described hereinabove thus provide the ability for conventional Pentium-compatible, x86-architecture, microprocessors to be implemented in a system in which split, or asynchronous, bus transactions are supported. Multiprocessor systems utilizing these microprocessors thus may have their performance significantly improved, by allowing bus traffic to be controlled in a much more efficient manner. Furthermore, advanced microprocessors incorporating out-of-order execution capability may be used according to existing bus protocol, while still obtaining the benefit of asynchronous bus transactions as is useful for the memory and input/output accesses used in out-of-order execution.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor-based data processing system having asynchronous bus transaction capability, comprising:

a subsystem;

a first CPU, implemented as a microprocessor of the x86-architecture type, having address terminals, data terminals, and control terminals, the first CPU having driver and receiver circuitry connected to a selected group of the address terminals to operate as input/output terminals, each of the address terminals, data terminals, and control terminals connected to a bus;

a subsystem controller, connected on one side to the bus and on another side to the subsystem;

wherein the first CPU is configured to request an asynchronous transaction by driving a first signal combination at selected ones of its control terminals, in combination with driving a transaction identification code at a selected group of address terminals simultaneously with the driving of an address value onto the bus;

and wherein the subsystem controller is for presenting an asynchronous transaction identification code at the selected group of address terminals of the first CPU to accept the requested asynchronous transaction.

2. The system of claim 1, further comprising:

a second CPU, implemented as a microprocessor of the x86-architecture type, having address terminals, data terminals, and control terminals, the second CPU having driver and receiver circuitry connected to a selected group of the address terminals to operate as input/output terminals, each of the block address terminals, data terminals, and control terminals connected to the bus;

wherein the second CPU is configured to request an asynchronous transaction by driving a first signal combination at selected ones of its control terminals, in combination with driving a transaction identification code at a selected group of address terminals simultaneously with the driving of an address value onto the bus;

and wherein the subsystem controller is also for presenting an asynchronous transaction identification code at the selected group of address terminals of the second CPU to accept the requested asynchronous transaction.

3. The system of claim 2, wherein the first and second CPUs each comprise bus interface units coupled to the address terminals, data terminals, and control terminals;

and further comprising:

an inter-processor arbitration bus coupled to the bus interface units of the first and second CPUs, for communicating inter-processor arbitration signals therebetween.

4. The system of claim 1, wherein the subsystem controller presents an acknowledge code to selected ones of the control terminals of the first CPU, in combination with the asynchronous transaction identification code at the selected group of address terminals, responsive to the subsystem controller accepting the requested asynchronous transaction.

5. The system of claim 4, wherein the first CPU has driver and receiver circuitry connected to a first plurality of the control terminals to operate as input/output terminals, at least one of the first plurality of control terminals selected from a group of terminals consisting of the M/IO#, D/C#, W/R#, SCYC, and LOCK# terminals;

and wherein the acknowledge code corresponds to a signal combination applied to at least one of the first plurality of control terminals.

6. The system of claim 5, wherein the subsystem controller presents a non-acknowledge code responsive to not accepting the requested asynchronous transaction.

7. The system of claim 6, wherein the non-acknowledge code corresponds to a signal combination applied to at least one of the first plurality of control terminals.

8. The system of claim 5, wherein the control terminals at which the first signal combination is presented by the first CPU include the first plurality of control terminals.

9. The system of claim 1, wherein the subsystem comprises main memory;

wherein the subsystem controller comprises a memory controller;

and wherein the first signal combination driven by the first CPU at selected ones of its control terminals to request an asynchronous memory transaction comprises driving a memory/IO select signal to select a memory access, in combination with driving a data/control select signal to select data.

10. The system of claim 1, wherein the first CPU further has an asynchronous acknowledge terminal;

and wherein the subsystem controller presents an acknowledge code to the asynchronous acknowledge terminal, in combination with the asynchronous transaction identification code at the selected group of address terminals, responsive to the subsystem controller accepting the requested asynchronous transaction.

11. The system of claim 1, wherein the selected group of address terminals correspond to the byte enable terminals.

12. The system of claim 1, wherein the first CPU further comprises a control register for storing a flag to disable requesting of an asynchronous transaction.

13. A method of operating a microprocessor based system to effect asynchronous bus transactions, the system including a microprocessor of the x86-architecture type, having address terminals, control terminals, and data terminals connected to a bus, and a subsystem controller connected to the bus for controlling access to a subsystem, comprising the steps of:

requesting a bus transaction by operating the microprocessor to simultaneously drive a first signal combination of control signals, a transaction identifier and an address value onto the bus;

determining whether the requested bus transaction can be performed asynchronously;

responsive to the determining step determining that the bus transaction can be performed asynchronously, presenting an acknowledge code to at least one selected control terminal of the microprocessor in combination with presenting the transaction identifier to a selected plurality of address terminals of the microprocessor.

14. The method of claim 13, further comprising:

responsive to the determining step determining that the bus transaction cannot be performed asynchronously, presenting a non-acknowledge code to at least one selected control terminal of the microprocessor.

15. The method of claim 13, further comprising:

indicating to the microprocessor whether or not the bus transaction may be accepted as an asynchronous transaction in a bus cycle following a bus cycle in which the requesting step is made.

16. The method of claim 15, further comprising:

responsive to the indicating step indicating that the bus transaction may not be accepted as an asynchronous transaction, immediately performing the requested bus transaction as a synchronous transaction.

17. The method of claim 14, wherein the acknowledge and non-acknowledge codes are presented to a plurality of control terminals including at least one selected from the group consisting of the consisting of the M/IO#, D/C#, W/R#, SCYC, and LOCK# terminals.

18. The method of claim 14, further comprising:

wherein the first signal combination of control signals used in the requesting step is presented at control terminals including at least one of the terminals in the selected plurality of control terminals to which the acknowledge and non-acknowledge codes are presented.

19. The method of claim 13, further comprising:

after the requesting step, and before the step of presenting a transaction identifier, performing bus transaction cycles corresponding to previously requested transactions.

20. The method of claim 13, further comprising:

after the step of presenting a transaction identifier, performing bus transaction cycles corresponding to previously requested transactions; and then performing the requested bus transaction.

21. The method of claim 13, further comprising, after the requesting step, performing a priority arbitration among the plurality of microprocessors.

22. The method of claim 13, wherein the system includes a plurality of microprocessors, each of the x86-architecture type and having a cache memory;

wherein the requesting step is performed by a first microprocessor to request a memory access;

and further comprising:

after the requesting step, determining whether the memory access requested by the first microprocessor in the requesting step corresponds to a memory location stored in a cache memory in one of the plurality of microprocessors other than the first microprocessor; and responsive to determining that the memory access requested by the first microprocessor in the requesting step corresponds to a memory location stored in a cache memory in one of the plurality of microprocessors other than the first microprocessor, halting the requested bus transaction.

23. The method of claim 13, further comprising:

disabling the microprocessor from performing the requesting step, by writing a disable code to a control register in the microprocessor.

* * * * *